(12) United States Patent
Herron et al.

(10) Patent No.: US 6,718,265 B2
(45) Date of Patent: Apr. 6, 2004

(54) PETROPHYSICAL PROPERTY ESTIMATION USING AN ACOUSTIC CALIBRATION RELATIONSHIP

(75) Inventors: Michael M. Herron, Ridgefield, CT (US); Susan L. Herron, Ridgefield, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/219,356

(22) Filed: Aug. 15, 2002

(65) Prior Publication Data

US 2004/0034474 A1 Feb. 19, 2004

(51) Int. Cl.[7] .................................................. G01V 5/08
(52) U.S. Cl. ........................... 702/8; 73/1.85; 73/152.15
(58) Field of Search ......................... 702/6, 8; 324/303; 73/1.85, 152.14, 152.15

(56) References Cited

U.S. PATENT DOCUMENTS

| | | | | |
|---|---|---|---|---|
| 4,712,424 A | | 12/1987 | Herron | 73/152 |
| 4,722,220 A | | 2/1988 | Herron | 73/152 |
| 4,773,264 A | | 9/1988 | Herron | 73/152 |
| 4,810,876 A | | 3/1989 | Wraight et al. | 250/256 |
| 4,817,062 A | * | 3/1989 | De Buyl et al. | 367/73 |
| 4,903,527 A | | 2/1990 | Herron | 73/152 |
| 4,964,099 A | * | 10/1990 | Carron | 367/73 |
| 4,972,383 A | * | 11/1990 | Lailly | 367/73 |
| 5,321,613 A | * | 6/1994 | Porter et al. | 702/1 |
| 5,444,619 A | * | 8/1995 | Hoskins et al. | 702/13 |
| 5,471,057 A | | 11/1995 | Herron | 250/269.6 |
| 5,583,825 A | * | 12/1996 | Carrazzone et al. | 367/31 |
| 5,675,147 A | * | 10/1997 | Ekstrom et al. | 250/256 |
| 5,786,595 A | | 7/1998 | Herron et al. | 250/256 |
| 5,798,982 A | * | 8/1998 | He et al. | 367/73 |
| 5,835,882 A | * | 11/1998 | Vienot et al. | 702/7 |
| 5,848,379 A | * | 12/1998 | Bishop | 702/6 |
| 5,889,729 A | * | 3/1999 | Frenkel et al. | 367/73 |
| 5,966,672 A | * | 10/1999 | Knupp | 702/16 |
| 6,140,816 A | | 10/2000 | Herron | 324/303 |
| 6,205,402 B1 | * | 3/2001 | Lazaar et al. | 702/2 |
| 6,255,819 B1 | * | 7/2001 | Day et al. | 324/303 |
| 6,302,221 B1 | * | 10/2001 | Hamman et al. | 175/50 |
| 6,374,185 B1 | * | 4/2002 | Taner et al. | 702/6 |

OTHER PUBLICATIONS

Biot, M. A. "Theory of Propagation of Elastic Waves in a Fluid Saturated Porous Solid. I. Low–Frequency Range". *J. Acoust. Soc. Amer.*, vol. 28, No. 2, pp. 168–178 (Mar. 1956).

(List continued on next page.)

*Primary Examiner*—Donald E. McElheny, Jr.
(74) *Attorney, Agent, or Firm*—William B. Batzer; John J. Ryberg

(57) ABSTRACT

A method of estimating a petrophysical property of a subsurface area that includes deriving an acoustic calibration relationship correlating acoustic propagation characteristics of a first subsurface area with a petrophysical property of the first subsurface area determined using nuclear spectroscopy measurements; processing acoustic data acquired from a second subsurface area to determine acoustic propagation characteristics associated with a plurality of regions within the second subsurface area; and estimating the petrophysical property of the regions within the second subsurface area using the calibration relationship and the acoustic propagation characteristics associated with the second subsurface area.

An associated method includes determining one or more boundaries within the first subsurface area, deriving different acoustic calibration relationships on opposite sides of these one or more boundaries, and then using these different acoustic calibration relationships to estimate a petrophysical property of regions within the second subsurface area.

13 Claims, 4 Drawing Sheets

OTHER PUBLICATIONS

Biot, M. A. "Theory of Propagation of Elastic Waves in a Fluid Saturated Porous Solid. II. Higher–Frequency Range". *J. Acoust. Soc. Amer.*, vol. 28, No. 2, pp. 179–191 (Mar., 1956).

Gassmann, F. "Uber die Elastizitat Poroser Medien". *Vier. Der Natur Gesellschaft*, vol. 96, pp. 1–23 (Mar. 1951).

Goldberg, I. et al. "A Semi–Empirical Velocity–Porosity-Clay Model for Petrophysical Interpretation of P– and S–Velocities". *Geophysical Propecting*, vol. 46, pp. 271–285 (1998).

Grau, J. A. "Elemental Concentrations from Thermal Neutron Capture Gamma–ray Spectra in Geological Formations". *Nuclear Geophysics*, vol. 3, No. 1, pp. 1–9 (1989).

Han, D. et al. "Effects of Porosity and Clay Content on Wave Velocities in Sandstones". *Geophysics*, vol. 51, No. 11, pp. 2093–2105 (Nov. 1986).

Herron, S.L. et al. "Application of Nuclear Spectroscopy Logs to the Derivation of Formation Matrix Density". *SPWLA 41st Ann. Log. Symp.*, Paper JJ, (Jun., 2000).

Herron, M. M. et al. "A Robust Permeability Estimator for Siliciclastics". *SPE 49301* (Sep., 1998).

Herron, M. M. et al. "Quantitative Lithology: Open and Cased Hole Applications Derived from Integrated Core Chemistry and Mineralogy Data Base". *Core–Log Integration*, Geological Soc. Spec. Publ. No. 136, pp. 81–95 (1998).

Herron, M. M. et al. "Log Interpretation Parameters Determined from Chemistry, Mineralogy and Nuclear Forward Modeling". *Proceeding 1997*, Int. Symp. Soc. Core Anal., SCA–9727, p. 12 (Sep., 1997).

Herron, S. L. et al. "Quantitative Lithology: An Application for Open and Cased Hole Spectroscopy", *SPWLA*, 37th Ann. Log. Symp., Paper E (Jun., 1996).

Horkowitz, J. P. et al. "Complex Reservoir Evaluation in Open and Cased Wells". *SPWLA Trans.*, 38th Ann. Log. Symp., Paper W (Jun., 1997).

Johnson, D. L. et al. "New Pore–Size Parameter Characterizing Transport in Porous Media" *Physical Review Letters*, vol. 57, No. 20, pp. 2564–2567 (Nov., 1986).

Klimentos. "The Effect of Porosity–Permeability–Clay Content on the Velocity of Compressional Wave". *Geophysics*, vol. 56, No. 12, pp. 1930–1939 (Dec., 1991).

Sen, P. N. et al. "Electrical Conduction in Clay Bearing Sandstones at High and Low Salinities". *J. Appl. Phys.*, vol. 63, No. 10, pp. 4832–4840 (May, 1988).

Tosaya, C. et al. "Effects of Diagenesis and Clays on Compressional Velocities in Rocks". *Geophysical Research Letters*, vol. 9, No. 1, pp. 5–8 (Jan., 1982).

Wyllie, M. R. J. et al. "Elastic Wave Velocities in Heterogeneous and Porous Media". *Geophysics*, vol. 21, No. 1, pp. 41–70 (Jan., 1956).

* cited by examiner

PETROPHYSICAL PROPERTY ESTIMATION USING AN ACOUSTIC CALIBRATION RELATIONSHIP

FIELD OF THE INVENTION

The present invention relates to a method of estimating a petrophysical property of a subsurface area and, more particularly, to a method of estimating a petrophysical property of a subsurface area using an acoustic calibration relationship.

BACKGROUND OF THE INVENTION

Acoustic data has a tremendous role in oilfield exploration and production because it is often the best way of "seeing" deeply into a subsurface formation. However, the data that can be readily extracted, notably compressional and shear velocities and acoustic impedances, are difficult to use for useful prediction of petrophysical properties throughout an interval. Equations such as those described in Wyllie, et al., "Elastic wave velocities in heterogeneous and porous media": Geophysics, 21, 41–70, for predicting porosity are only valid for single-mineral formations. Equations such as those in Han et al., "Effects of porosity and clay content on wave velocities in sandstones": Geophysics, 51, 2093–2105, and Tosaya et al., "Effects of diagenesis and clays on compressional velocities in rocks": Geophysical Research Letters, Vol. 5, No. 1, 5–8, that predict compressional and shear velocities from clay and porosity are generally not sufficiently accurate nor robust to invert for clay and porosity from velocities.

A number of studies have been made of the parameters governing acoustic velocities in siliciclastics. The two main parameters are porosity, $\emptyset$, and clay content, $C$, with effective stress of lesser significance. One set of these algorithms, from Han et al., is given below:

$$V_p = 5.59 - 6.93\emptyset - 2.18C,$$
$$V_s = 3.52 - 4.91\emptyset - 1.89C. \quad (1)$$

Klimentos, in "The effect of porosity-permeability-clay content on the velocity of compressional waves": Geophysics, 56, 1930–1939, published a similar relationship for compressional velocity as a function of porosity and clay:

$$V_p = 5.87 - 6.99\emptyset - 3.33C. \quad (2)$$

The inventors have compared these prediction algorithms to measured data, and the measured and predicted curves often differ by as much or more than 1 km/sec. Other published algorithms produce a similar lack of agreement with measured velocities.

There are several possible explanations for the lack of agreement. Clay concentrations are typically determined by thin section analysis or from gamma-ray logging data and this is notoriously inaccurate. In Goldberg et al., "A semi-empirical velocity-porosity-clay model for petrophysical interpretation of P- and S-velocities": Geophysical Prospecting, 46, 271–285, for instance, clay content was estimated from gamma-ray logging data.

It is also possible that the core samples used in the analysis do not well represent the entire sedimentary environment and additional sample measurements are required to determine if some type of global relationship could even theoretically be developed.

Previous work in this area has tended to focus on the analysis of rocks that may act as hydrocarbon reservoirs, such as sandstones, and have often overlooked the difficulties involved in determining petrophysical properties of other lithologies, such as shales.

A further problem with this prior work is that they appear to have assumed that a single correlation relationship would be sufficient to properly correlate petrophysical properties with acoustic properties over a wide range of subsurface formations.

Accordingly, it is an object of the present invention to provide an improved method of estimating a petrophysical property of a subsurface area using an acoustic calibration relationship.

An object of certain embodiments of this method is to estimate petrophysical properties away from a borehole using seismic data and an acoustic calibration relationship developed from measurements obtained near the borehole.

Further objects of certain embodiments of the inventive method include estimating porosity, clay fraction, and/or permeability of regions within a subsurface area from seismic measurements obtained from the subsurface area and an acoustic calibration relationship developed from measurements made in a nearby well or in a well from a geologically-related area.

SUMMARY OF THE INVENTION

One aspect of this invention involves a method of estimating a petrophysical property of a subsurface area including deriving an acoustic calibration relationship correlating acoustic propagation characteristics of a first subsurface area with a petrophysical property of the first subsurface area determined using nuclear spectroscopy measurements; processing acoustic data acquired from a second subsurface area to determine acoustic propagation characteristics associated with a plurality of regions within the second subsurface area; and estimating the petrophysical property of the regions within the second subsurface area using the acoustic calibration relationship and the acoustic propagation characteristics associated with the second subsurface area. Another aspect of the invention involves determining one or more boundaries within the first subsurface area, deriving different acoustic calibration relationships on opposite sides of these one or more boundaries, and then using these different acoustic calibration relationships to estimate a petrophysical property of regions within the second subsurface area. Further features and applications of the present invention will be apparent from the figures and detailed description that follows.

DETAILED DESCRIPTION

Figure 1:
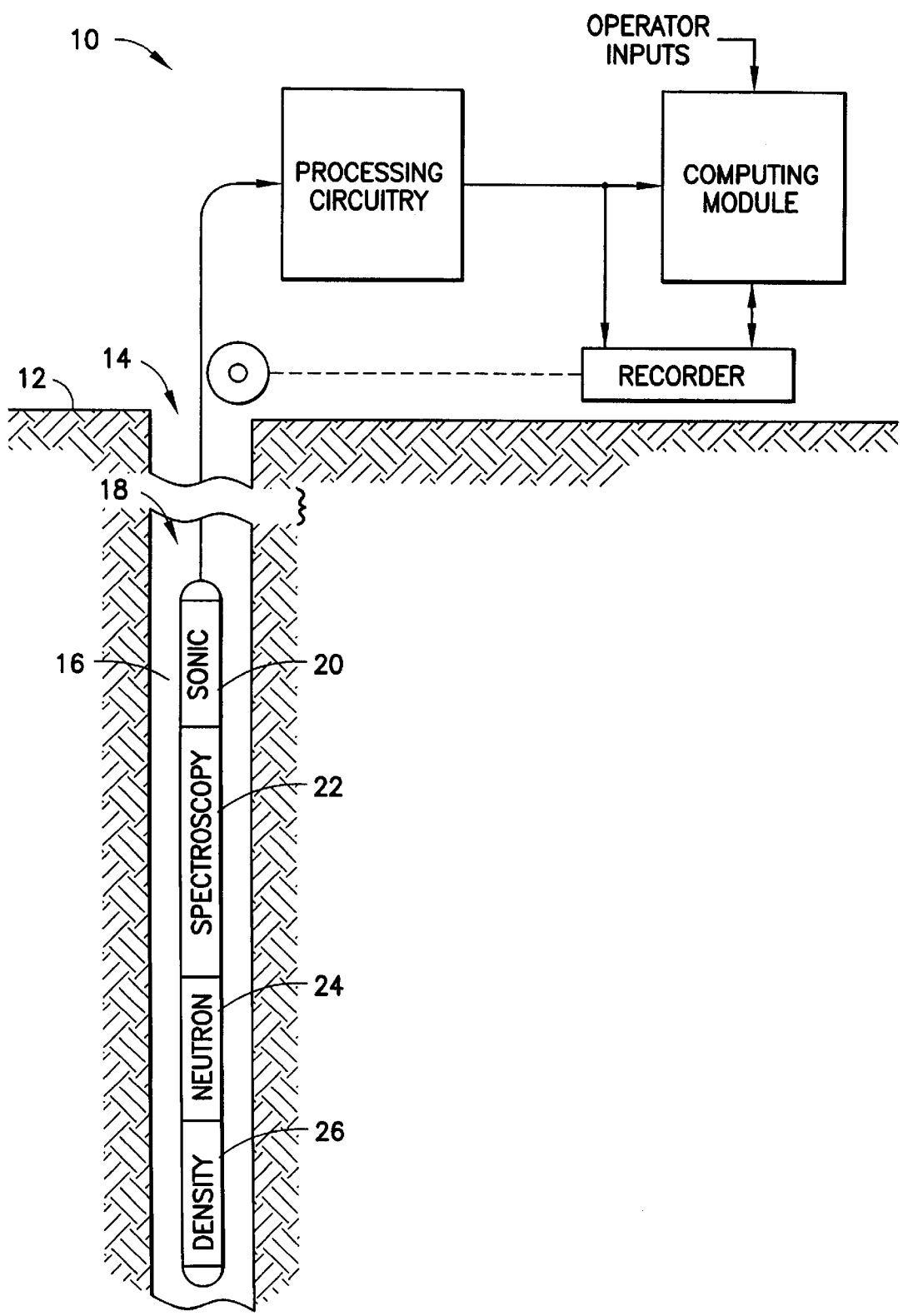
FIG. 1 is a schematic illustration of wireline logging tools being used to acquire sonic, spectroscopy, neutron, and density measurements from a subsurface area.

An example wireline data acquisition and processing system 10 is shown deployed within a subsurface formation 12. A borehole 14 has been drilled within the subsurface formation 12 and is filled with a drilling fluid 16. A logging tool 18 is suspended in the borehole 14 on a cable, the deployed length of which substantially determines the depth of the logging tool within the subsurface formation 12. The cable length is controlled by conventional means at the surface (not shown). In this embodiment, logging tool 18 includes a sonic device 20, a spectroscopy device 22, a neutron device 24, and a density device 26. The sonic device 20 may be, for instance, Schlumberger's DSI™ cross-dipole sonic tool, the spectroscopy device 22 may be Schlumberger's ECS™ tool, and the neutron device 24 and density device 26 may be components of Schlumberger's PLATFORM EXPRESS™ "triple combo" tool. Circuitry, shown at the surface, although portions thereof may be located downhole, illustrates processing circuitry for the various components of logging tool 18. A sheave wheel can be provided to determine the depth of the logging tool 18, and signals therefrom are typically coupled with a recorder, which could be electrical, magnetic, optical, graphical, and/or other storage and recording techniques performed on signals received from the processing circuitry and computing module.

Gamma-gamma bulk density measurements (output from the density device 26 discussed above) are typically converted to "density porosity" values during or soon after logging. The equation relating bulk density and porosity is:

$$\emptyset_t = \frac{\rho_{ma} - \rho_b}{\rho_{ma} - \rho_f}, \quad (3)$$

where $\emptyset_t$ is the total porosity, $\rho_b$ is the bulk density, $\rho_{ma}$ is the matrix density, and $\rho_f$ is the fluid density. Since $\rho_b$ is measured and $\rho_f$ is generally well known (it is typically assumed to be the density of the mud filtrate), the largest contributor to uncertainty in the calculation of porosity is $\rho_{ma}$. Typically, this parameter is unknown and a default constant such as 2.65 g cm$^{-3}$, the density of quartz, is used for field data processing and display.

Figure 3:
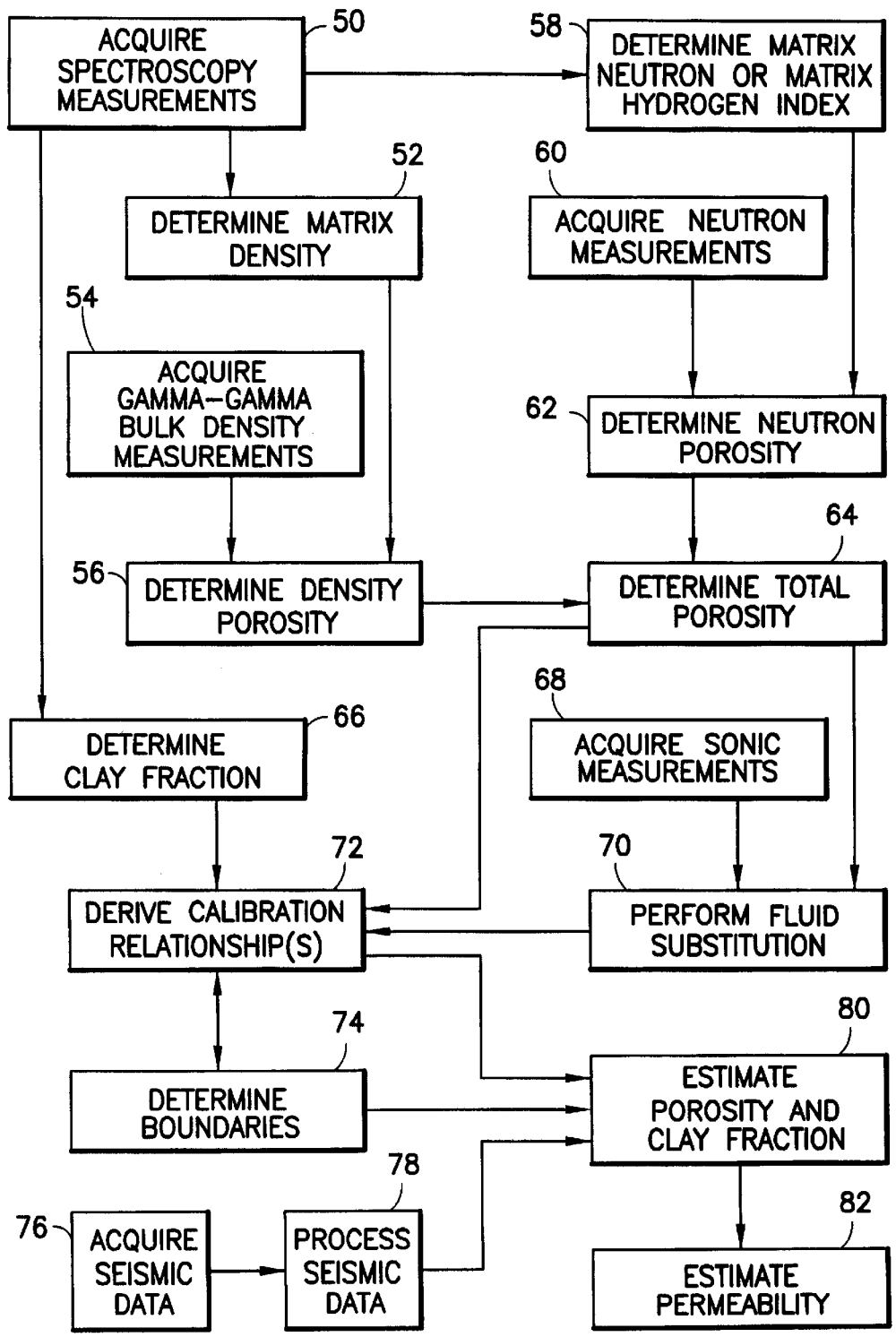
FIG. 3 is a flow chart depicting processes performed in connection with certain embodiments of the inventive method.

In a different interpretation paradigm called Direct Computation of Matrix Properties (discussed in more detail in Herron, S. L and Herron, M. M., 2000, Application of nuclear spectroscopy logs to the derivation of formation matrix density, Trans. SPWLA 41 st Ann. Log. Symp., Dallas, Tex., Paper J J, incorporated by reference), the matrix density can be approximated as a linear combination of the formation elemental fractions of silicon, calcium, iron and sulfur with a standard error of only 0.015 g cm$^{-3}$ according to the relationship:

$$\rho_{ma} = 2.620 + 0.0490 \text{DWSI} + 0.2274 \text{DWCA} + 1.993 \text{DWFE} + 1.193 \text{DWSU}, \quad (4)$$

where DWSI, DWCA, DWFE, and DWSU are weight fractions of the elements silicon, calcium, iron, and sulfur from spectroscopy measurements. This process is depicted in FIG. 3 as Acquire Spectroscopy Measurements 50 and Determine Matrix Density 52. The computed matrix density values are combined with the gamma-gamma bulk density measurements acquired by the density device 26 (shown in FIG. 3 as Acquire Gamma-Gamma Bulk Density Measurements 54) in Determine Density Porosity 56 to produce corrected density porosity values.

A similar approach is taken to compute corrected neutron porosity values. In the Determine Matrix Neutron or Matrix Hydrogen Index 58, matrix neutron values or matrix hydrogen index values (depending on the type of neutron measurements being made) are computed, again typically from formation elemental weight fractions determined from the spectroscopy device 22. The following algorithms have been used to compute appropriate matrix neutron and matrix hydrogen index values:

$$\text{matrix neutron} = 0.40816 - 0.889 \text{DWSI} - 1.0136 \text{DWCA} - 0.25718 \text{DWFE} + 0.67533 \text{DWSU}, \quad (5)$$

$$\text{matrix hydrogen index} = 0.30155 - 0.6229 \text{DWSI} - 0.75759 \text{DWCA} - 0.47354 \text{DWFE} + 0.4521 \text{DWSU}, \quad (6)$$

where DWSI is the silicon concentration in weight percent, expressed as a decimal, DWCA is the calcium concentration, DWFE is the iron concentration, and DWSU is the sulfur concentration from spectroscopy measurements. These computed matrix neutron or matrix hydrogen index values are combined with neutron measurements acquired by the neutron tool 24 (shown in FIG. 3 as Acquire Neutron Measurements 60) to produce corrected neutron porosity values in Determine Neutron Porosity 62.

The corrected density porosity values and corrected neutron porosity values are used to produce corrected total porosity values in Determine Total Porosity 64. The preferred method for determining the corrected total porosity is to select the corrected density porosity values in the absence of neutron/density cross-over and to combine the corrected neutron and density porosity values in the presence of neutron/density cross-over, such as by computing a weighted average of these values.

The elemental concentration logs of silicon, calcium, iron, and sulfur can also be used to determine the clay fraction of the formation. This approach uses the elements silicon, calcium, and iron to estimate clay according to equation 7:

$$\text{Clay} = 1.91(100 - 213.9 \text{DWSI} - 249.7 \text{DWCA} - 199 \text{DWFE}), \quad (7)$$

where DWSI, DWCA, and DWFE are weight fractions of the elements silicon, calcium, and iron. Carbonates concentrations (combining calcite and dolomite) can also be determined from calcium. Anhydrite or pyrite concentrations can further be determined using the sulfur log. The remainder of the formation is assumed to be composed of sand (quartz, feldspar, and mica minerals).

These processes, including various alternatives thereto, are described in substantially more detail in the following documents, commonly-assigned U.S. Patents, and commonly-assigned U.S. Patent Application, each of which are incorporated by reference:

Grau, J. A., and Schweitzer, J. S., 1989, Elemental Concentrations from Thermal Neutron Capture Gamma-ray Spectra in Geological Formations; Nuclear Geophysics; Vol. 3, No. 1, pp. 1–9;

Herron, S. L. and Herron, M. M., 1996, Quantitative lithology: An application for open and cased hole spectroscopy, Trans. SPWLA 37th Ann. Log. Symp., New Orleans, La., Paper E;

Herron, M. M. and Herron, S. L., 1997, Log interpretation parameters determined from chemistry, mineralogy and nuclear forward modeling, Proc. 1997 Int. Symp. Soc. Core Anal., Calgary, 7–10 September, SCA-9727, 12 p.;

Herron, M. M. and Herron, S. L. (1998) "Quantitative lithology: open and cased hole applications derived from integrated core chemistry and mineralogy data base," in: Harvey, P. K. & Lovell, M. A. (eds) Core-Log Integration, Geological Society Special Publication No 136, pp. 81–95;

Horkowitz, J. P. and Cannon, D. E., 1997, Complex reservoir evaluation in open and cased wells, Trans. SPWLA 38$^{th}$ Ann. Log. Symp., Dallas, Tex., Paper W;

U.S. Pat. No. 4,712,424; entitled "Quantitative determination by elemental logging of subsurface formation properties", issued Dec. 15, 1987 to Michael M. Herron;

U.S. Pat. No. 4,722,220; entitled "Quantitative determination by elemental logging of subsurface formation properties", issued Feb. 2, 1988 to Michael M. Herron;

U.S. Pat. No. 4,810,876; entitled "Logging apparatus and method for determining absolute elemental concentrations of subsurface formations", issued Mar. 7, 1989 to Peter D. Wraight et al.;

U.S. Pat. No. 4,903,527; entitled "Quantitative clay typing and lithological evaluation of subsurface formations", issued Feb. 27, 1990 to Michael M. Herron;

U.S. Pat. No. 5,471,057; entitled "Method and apparatus for determining elemental concentrations for D-ray spectroscopy tools", issued Nov. 28, 1995 to Susan L. Herron;

U.S. Pat. No. 5,786,595; entitled "Method for estimating lithological fractions using spectroscopy measurements", issued Jul. 28, 1998 to Susan L. Herron and Michael M. Herron; and U.S. patent application Ser. No. 09/975,416, entitled "Real Time Petrophysical Evaluation System", filed Oct. 11, 2001 by Michael M. Herron and Susan L. Herron.

A significant advantage of this method of determining total porosity and clay fraction is that the porosity and clay fraction values can be accurately determined for both potential hydrocarbon reservoirs, such as sandstones, and relatively impermeable formations, such as shales, and the accuracies of these porosity and clay fraction values are not significantly degraded by differing lithologies in the formations being investigated.

The process of acquiring sonic measurements using sonic device 20 is depicted in FIG. 3 as Acquire Sonic Measurements 68. These sonic measurements may include compressional and shear velocities. The compressional velocities may be corrected for the presence of gas (i.e. modifying the measured compressional velocities so they resemble the values that would have been obtained if a gas containing interval was completely filled with water or oil) or corrected for mud-filtrate borehole invasion effects (i.e. modifying the measured compressional velocities so they resemble the values that would have been obtained if the mud filtrate had not invaded the subsurface formation). This is depicted in FIG. 3 as Perform Fluid Substitution 70. The Perform Fluid Substitution 70 process will often use as input both the total porosity output from Determine Total Porosity 64 and a quantitative indicator of the presence of gas, typically derived from neutron/density crossover. Conventional methods of performing fluid substitution include applying the Gassmann and/or Biot equations, described in more detail in the following references, both of which are incorporated by reference:

Biot, M. A., 1956, Theory of propagation of elastic waves in a fluid saturated porous solid. II. Higher-frequency range: J. Acoust. Soc. Amer., 28, 168–178; and Gassmann, F., 1951, Uber die elastizitat poroser medien; Vier. Der Natur Gesellschaft, 96, 1–23.

An acoustic calibration relationship is developed that correlates the corrected acoustic propagation characteristics with the petrophysical properties discussed above. In one embodiment, least squares solutions to two pairs of linear equations (8, 9 and 10, 11) were determined, where Ø and C represent porosity and clay, and A, B, and D–M are empirical constants.

$$\emptyset = A + BV_p + DV_s, \quad (8)$$

$$C = E + FV_p + GV_s, \quad (9)$$

$$V_p = H - I\emptyset - JC, \quad (10)$$

$$V_s = K - L\emptyset - MC. \quad (11)$$

Estimated porosity and clay values determined using these equations were then averaged to produce final estimated values for porosity and clay. Many alternative equations may also be used to derive this correlation relationship, as will be obvious to those skilled in the art.

A single acoustic calibration relationship may not be appropriate for an entire subsurface interval, however. It may be necessary, for instance, to derive different correlation relationships above and below one or more significant petrophysical or geological sequence boundaries. This process is depicted in FIG. 3 as Determine Boundaries 74.

One method for determining boundaries is to determine a single correlation relationship for the entire interval being examined and then to perform a windowed analysis of the determined petrophysical properties versus petrophysical properties estimated using this calibration relationship and acoustic propagation characteristics of the interval being examined. If this analysis reveals a depth at which the errors between the determined and estimated values change from systematic under estimation to systematic over estimation, or vice versa, this depth may be identified as a boundary and different calibration relationships may be determined on opposite sides of this boundary to reduce these systematic errors. This process can be repeated to identify several such boundaries in the subsurface area being investigated. Using a relatively large window will reduce the likelihood that boundaries identified are the result of relatively insignificant deviations between the determined and estimated values. Many alternative methods for determining appropriate boundaries will be apparent to those skilled in the art.

Figure 2:
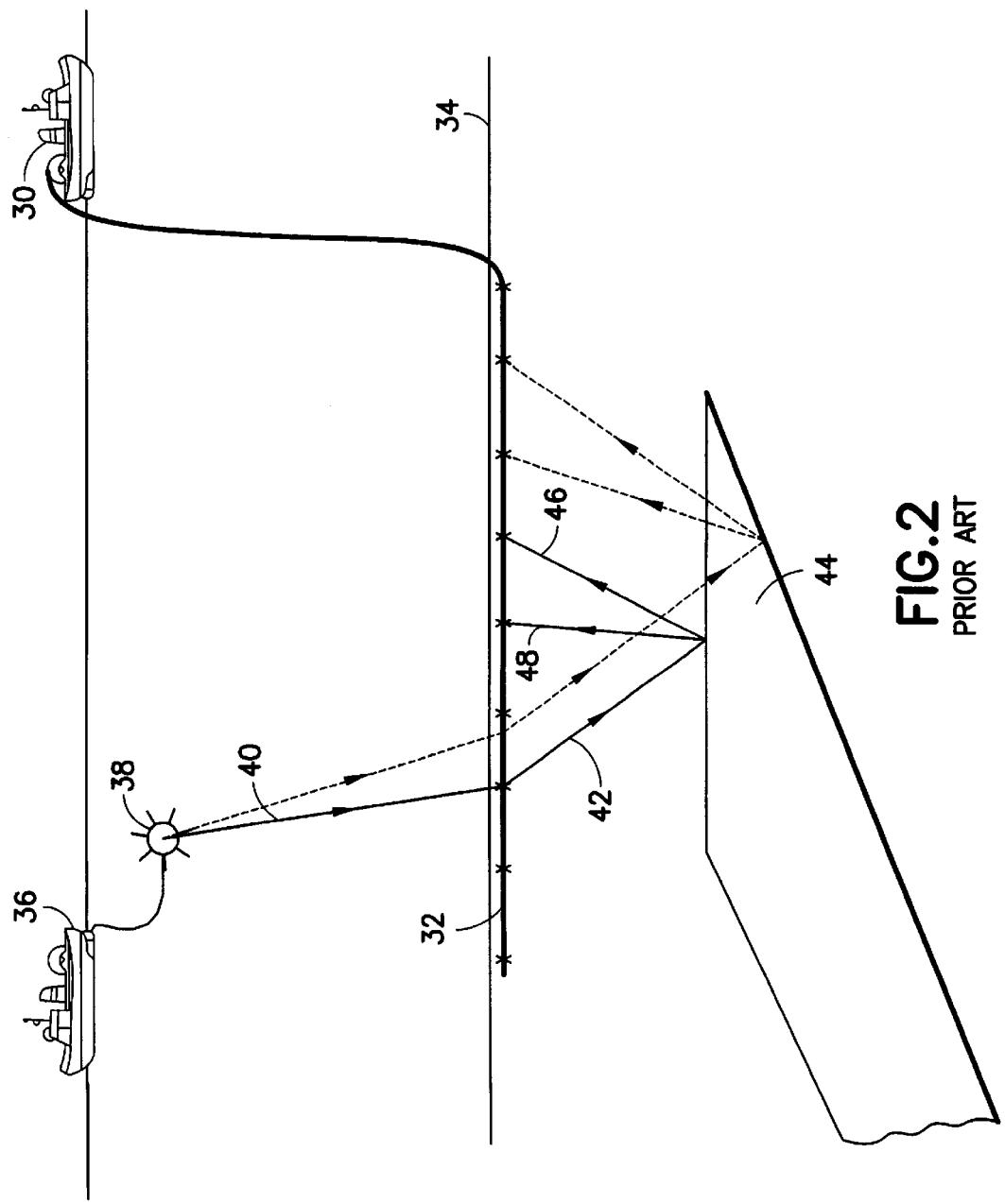
FIG. 2 is a schematic illustration of seabed multicomponent seismic data acquisition equipment being used to acquire seismic data.

Acoustic data, such as seismic data, from a plurality of regions within a subsurface area of interest is also acquired. In FIG. 2, an example prior art seabed multi-component seismic data acquisition system is shown acquiring seismic data from a subsurface area. A first seismic vessel 30 is shown with a deployed multi-component ocean bottom cable 32 resting on seafloor 34. A second seismic vessel 36 is shown towing a seismic source 38, such as an airgun. A seismic pulse from the seismic source 38 radiates away from the source after the airgun is fired and a portion of the pulse (shown in raytrace format as pulse 40) is refracted at the seafloor 34 and propagates through the geologic subsurface. This portion of the pulse (shown as subsurface pulse 42) encounters a subsurface area 74 and a portion of the pulse is reflected and split into both compressional and shear components (shown as compressional component 46 and shear component 48). These components are received by seismic receivers in ocean bottom cable 32 and the measurements are recorded on equipment on the first seismic vessel 30. This process is typically repeated for all seismic receivers and multiple source and receiver locations until a seismic data set containing information regarding the entire subsurface area of interest is collected. The seismic data is processed (shown in FIG. 3 as Process Seismic Data 78) and acoustic propagation characteristics of a plurality of regions within the, surface area of interest are determined. This will often consist of a "seismic data cube" that subdivides the entire subsurface area of interest into a large number of X,Y,Z grid blocks and includes estimates of acoustic propagation characteristics (such as interval compressional and shear velocities) for each of these grid blocks.

The acoustic calibration relationship(s) and any boundaries, as described above, are then used with these acoustic propagation characteristics to estimate one or more petrophysical properties of the subsurface area. This is depicted in FIG. 3 as both Estimate Porosity and Clay Fraction 80 and Estimate Permeability 82. The porosity and clay fraction may be determined directly by using the interval compressional and shear velocities ($V_p$ and $V_s$) associated with each cell and equations 8–11 with the derived empirical constants. If different calibration relationships are used, the boundaries identified in Determine Boundaries 74 will need to be propagated or assigned throughout the subsurface area of interest. In its simplest form, this may involve assuming that the boundaries are fixed in depth. A more sophisticated method that may be used when the area from which the seismic data is collected includes the well where the correlation relationship data was collected, is to propagate the boundary away from the borehole by tracking nearby seismic horizons. Similar methods can be used if equivalent geologic history, depositional environment, or other types of information are available for both the first subsurface area (where the calibration relationships are derived) and the second subsurface area (where the calibration relationships will be used).

Formation permeability is typically determined indirectly, using the porosity and clay fraction values in Estimate Permeability 82. This process robustly estimates permeability in siliciclastic and related formations based on the Lambda parameter. The Lambda parameter is a measure of the effective diameter of dynamically connected pores and, in the simplest pore geometries, can be approximated from the surface to pore volume ratio. It has been shown that the surface to pore volume data could be computed from mineralogy data or from lithology concentrations, such as clay fractions. The other required input data are the total porosity, the matrix density, and Archie's cementation exponent, m. In more complex pore systems at lower permeability, some of the pores begin to be ineffective in flow and the initially predicted permeabilities are too high but can be accurately lowered. The k-Lambda initial estimate can be made as follows:

$$k_\Lambda = \frac{Z\emptyset^{m^*+2}}{(1-\emptyset)^2(\rho_g)^2(6wcla+.22(1-wcla))^2}, \quad (12)$$

where Z is an optimized prefactor, Ø is total porosity, m* is Archie's cementation exponent, $\rho_g$ is the estimated matrix density (often assumed to be the density of quartz, 2.65 g/cc), and wcla is the lithology weight fraction of clay. If the initial estimate is less than 100 mD, the final estimate is computed using equation 13:

$$k_A = 0.037325 k_\Lambda^{1.714}. \quad (13)$$

These processes, including various alternatives thereto, are described in substantially more detail in the following documents and commonly-assigned U.S. Patents, each of which are incorporated by reference:

Herron, M. M., Johnson, D. L. and Schwartz, L. M., 1998, A robust permeability estimator for siliciclastics, SPE 49301;

Johnson, D. L., Koplik, J. and Schwartz, L. M., 1986, New pore-size parameter characterizing transport in porous media, Phys. Rev. Lett., 57, 2564–2567;

Sen, P. N., Goode, P. A. and Sibbit, A., 1988, Electrical conduction in clay bearing sandstones at high and low salinities, J. Appl. Phys., 63, 4832–4840;

U.S. Pat. No. 4,773,264; entitled "Permeability determinations through the logging of subsurface formation properties", issued Sep. 27, 1988 to Michael M. Herron; and U.S. Pat. No. 6,140,816; entitled "Method of determining the permeability of sedimentary strata", issued Oct. 31, 2000 to Michael M. Herron.

Figure 4:
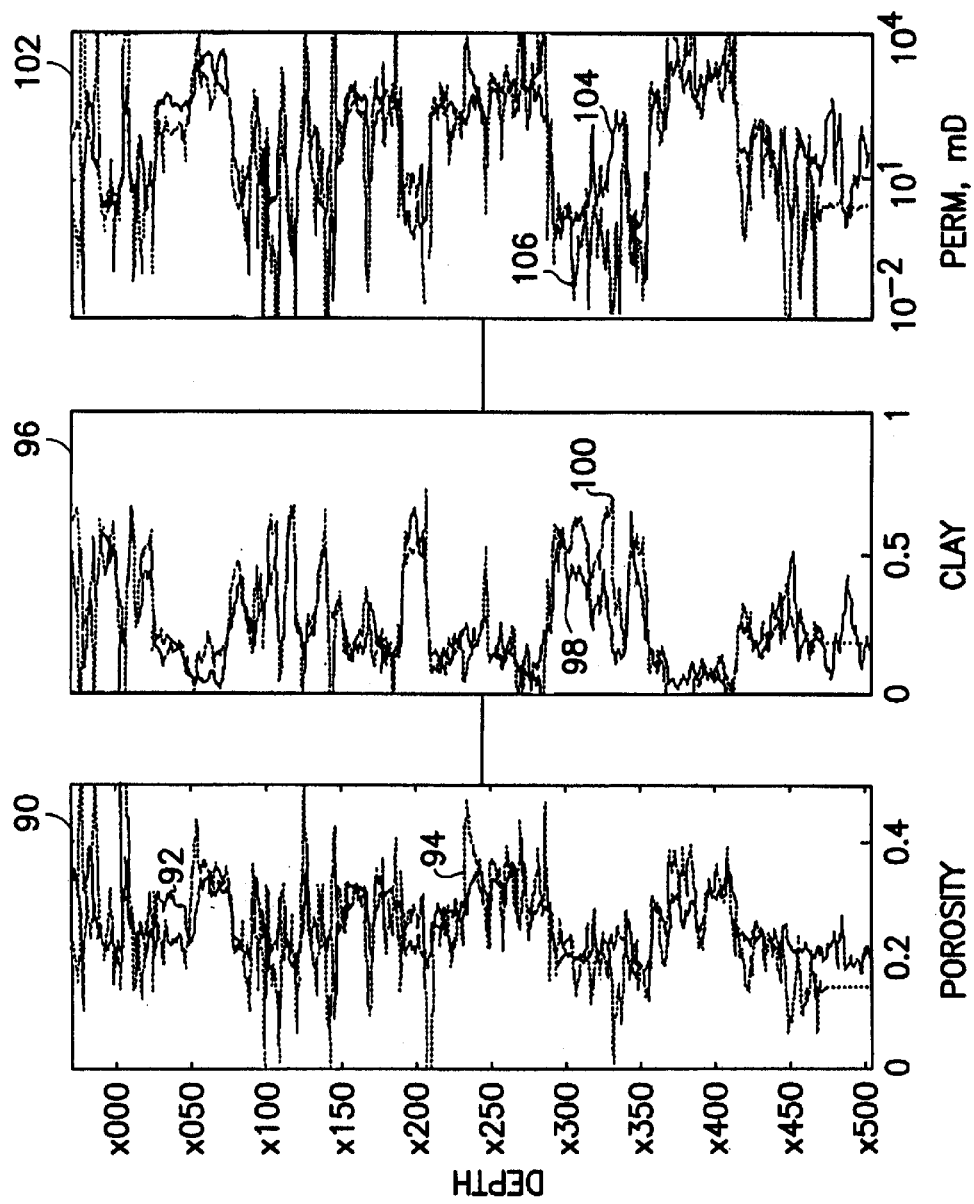
FIG. 4 is a display of determined petrophysical properties of a subsurface area compared with petrophysical properties that have been estimated using acoustic propagation characteristics and an acoustic calibration relationship.

FIG. 4 compares determined petrophysical properties with petrophysical properties that have been estimated using sonic openhole wireline logging derived acoustic propagation characteristics and a calibration relationship derived as described above from a well in Indonesia. The determined empirical constants used were A=0.47, B=−0.19, D=0.22, E=0.76, F=0.19, G=−0.71, H=3.72, I=2.22, J=1.28, K=2.08, L=1.12, and M=1.3. The coefficients used to estimate permeability were Z=200,000 milli-Darcies; m*=1.653+ 0.0818((6wcla+0.22(1−wcla))*$\rho_g$)$^{0.5}$, and $\rho_g$=2.65 g/cc. In first panel 90, estimated porosity 94 closely tracks determined porosity 92. Similarly in second panel 96, estimated clay fraction 100 closely tracks determined clay fraction 98. In third panel 102, estimated permeability 106 (determined using the estimated porosity and clay fraction values) tracks reasonably closely the determined porosity 104. Overall, the agreement is satisfactory, although some of the variability in the determined petrophysical properties are missing in the estimate. Due to the limited resolution of seismic data, additional loss of resolution in petrophysical properties estimated from seismic data is likely, particularly when the seismic data lacks significant high frequency energy.

The approach taken in the described embodiment of the inventive method can be summarized as follows:

1. Get accurate interpretations of subsurface area petrophysical properties, such as from nuclear spectroscopy, neutron, and density wireline logs.
2. Derive a calibration relationship between acoustic propagation measurements and these petrophysical properties, such as by correlating Vp and Vs from cross-dipole sonic logs with determined clay and porosity values.
3. Apply this calibration relationship to acoustic propagation characteristics associated with a second area, such as those extracted from seismic data, to estimate clay fraction and porosity values within this second area.
4. Use the estimated clay fraction and porosity values to compute permeability in accordance with the k-lambda relationship.

While the invention has been described herein with reference to certain examples and embodiments, it will be evident that various modifications and changes may be made to the embodiments described above without departing from the scope of the invention as set forth in the following claims.

Although an embodiment of the method utilizing openhole wireline logging acquired data is described, for instance, similar results may be obtained using cased hole wireline logging data, logging while drilling data, coring data, or combinations thereof. Similarly, although a seabed multi-component seismic data system is shown for purposes of illustration, similar results may be obtained using acoustic data acquired using wireline logging, logging while drilling, surface seismic acquisition, marine seismic acquisition, vertical seismic profiling, and inverse vertical seismic profiling/ drill bit noise acquisition methods.

There are also many alternative ways to derive acoustic calibration relationships between acoustic velocities, acoustic slownesses, acoustic moduli, acoustic impedances, and/or other acoustic propagation characteristics and petrophysical properties such as porosity, lithology, permeability, fluid fill, etc.

While the first subsurface area where the acoustic calibration relationship is derived and the second subsurface area where the acoustic calibration relationship is applied will often be displaced horizontally (seismic data may be acquired from an area away from the wellbore where the calibration relationship is determined or acoustic well logging data may be used that determines acoustic propagation characteristics some distance away from the wellbore), the method may also be used when the first subsurface area and the second subsurface area are only displaced vertically. The method may be used, for instance, to compute porosity, clay, and permeability values for washed out intervals of a well where the spectroscopy tool 22, neutron tool 24, and density tool 26 are unable to make adequate measurements, but the sonic tool 20 is still able to determine appropriate compressional and shear velocities in the washed out interval. A calibration relationship derived from data acquired above or below the washed out interval may be used with these compressional and shear velocities to estimate the porosity, clay fraction, and permeability of the washed out interval.

We claim:

1. A method of estimating a petrophysical property of a subsurface area, comprising:

deriving an acoustic calibration relationship correlating acoustic propagation characteristics of a first subsurface area with a petrophysical property of said first subsurface area determined using nuclear spectroscopy measurements;

processing acoustic data acquired from a second subsurface area to determine acoustic propagation characteristics associated with a plurality of regions within said second subsurface area; and estimating said petrophysical property of said regions within said second subsurface area using said calibration relationship and said acoustic propagation characteristics associated with said second subsurface area.

2. A method of estimating a petrophysical property of a subsurface area according to claim 1, wherein said petrophysical property comprises porosity or clay fraction.

3. A method of estimating a petrophysical property of a subsurface area according to claim 2, further including using said estimated petrophysical property to estimate the permeability of said regions within said second subsurface area.

4. A method of estimating a petrophysical property of a subsurface area according to claim 1, wherein said petrophysical properties of said first subsurface area are determined using neutron or density measurements.

5. A method of estimating a petrophysical property of a subsurface area according to claim 1, wherein said acoustic propagation characteristics of said first subsurface area have been corrected by performing a fluid substitution procedure.

6. A method of estimating a petrophysical property of a subsurface area according to claim 1, wherein said plurality of regions within said second subsurface area comprise siliciclastic geologic intervals.

7. A method of estimating a petrophysical property of a subsurface area according to claim 1, wherein said developing a calibration relationship comprises determining calibration coefficients associated with at least one linear equation relating said petrophysical property of said first subsurface area with said acoustic propagation characteristics of said first subsurface area.

8. A method of estimating a petrophysical property of a subsurface area according to claim 1, wherein said acoustic propagation characteristics comprise interval compressional velocity and interval shear velocity.

9. A method of estimating a petrophysical property of a subsurface area according to claim 1, wherein said first subsurface area and said second subsurface area are different intervals of a single wellbore.

10. A method of estimating a petrophysical property of a subsurface area according to claim 1, further including:

determining one or more boundaries within the first subsurface area;

deriving different acoustic calibration relationships on opposite sides of said one or more boundaries; and then using said different acoustic calibration relationships to estimate said petrophysical property of said plurality of regions within said second subsurface area.

11. A method of estimating a petrophysical property of a subsurface area, comprising:

determining one or more boundaries within a first subsurface area;

deriving different acoustic calibration relationships correlating acoustic propagation characteristics of said first subsurface area with a petrophysical property of said first subsurface area on opposite sides of said one or more boundaries;

processing acoustic data acquired from a second subsurface area to determine acoustic propagation characteristics associated with a plurality of regions within said second subsurface area; and estimating said petrophysical property of said regions within said second subsurface area using said different calibration relationships and said acoustic propagation characteristics associated with said second subsurface area.

12. A method of estimating a petrophysical property of a subsurface area according to claim 11, further including assigning one or more boundaries within said second subsurface area corresponding to said one or more boundaries within said first subsurface area using said acoustic data acquired from said second subsurface area.

13. A method of estimating a petrophysical property of a subsurface area, comprising:

determining a petrophysical property of a first subsurface area without relying on thin section analysis or gamma-ray logging data;

deriving an acoustic calibration relationship correlating acoustic propagation characteristics of said first subsurface area with said petrophysical property of said first subsurface area;

processing acoustic data acquired from a second subsurface area to determine acoustic propagation characteristics associated with a plurality of regions within said second subsurface area; and estimating said petrophysical property of said regions within said second subsurface area using said calibration relationship and said acoustic propagation characteristics associated with said second subsurface area.

* * * * *